Figure 1:
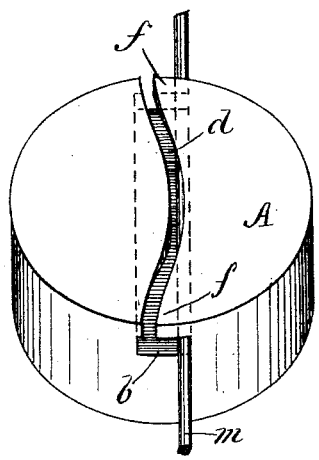

(No Model.)

C. N. HAMMOND.
INSULATOR.

No. 469,940. Patented Mar. 1, 1892.

WITNESSES.
Matthew Clark
A. H. Morrison

INVENTOR.
Charles N. Hammond
by
Macleod Calver & Randall
attys

UNITED STATES PATENT OFFICE.

CHARLES N. HAMMOND, OF BOSTON, MASSACHUSETTS.

INSULATOR.

SPECIFICATION forming part of Letters Patent No. 469,940, dated March 1, 1892.

Application filed September 30, 1891. Serial No. 407,231. (No model.)

*To all whom it may concern:*

Be it known that I, CHARLES N. HAMMOND, a citizen of the United States, residing at Boston, in the county of Suffolk and State of Massachusetts, have invented certain new and useful Improvements in Insulators, of which the following is a specification, reference being had therein to the accompanying drawings.

So far as known to me, electric wires are at present in practice usually secured to insulators by some separate securing device, as by a piece of wire or the like, or by carrying the electric wire around the outside of the insulator in a groove therein. This is objectionable, in that it takes time to secure the wire, and it adds to the expense and also interferes with the appearance of the work. In some instances insulators have been constructed with passages therethrough for the reception of the electric wires, such passages being open at one side for the introduction of the wires, and in order to retain the wires in place these insulators have been constructed with lips or flanges projecting from opposite sides of the slot or opening of the passage or past the median-line of the passage, it being necessary to incline or bend the wires around these lips or flanges in order to effect the introduction of the wires through the slots or openings into the passages. Whenever these insulators have been so constructed as to form a curved or irregular slot or opening leading into the passage with more than one overhanging lip or flange on one side of the slot or opening, the passage itself has been so formed as to bend or bind the wire, thereby interfering with endwise movement of the wire and rendering the insulators undesirable for use as guide-insulators. In some insulators having straight passages therethrough in which a wire may play or move endwise the slots or openings leading to the same have been straight diagonal slots or openings having each but one lip or flange on each side thereof.

The object of my invention is to provide an insulator of such construction that it shall with certainty and efficiency retain the electric wire in place within the passage therethrough, thereby obviating a defect of the class of insulators last described, and shall permit the electric wire to move endwise with freedom, thereby disposing of an objection to the class of insulators first described.

My invention will first be described with reference to the accompanying drawings, and then be particularly pointed out in the claim at the close of this specification.

In the accompanying drawings, to which reference is made in the following specification, I have shown my device in the best form known to me.

Figure 3:
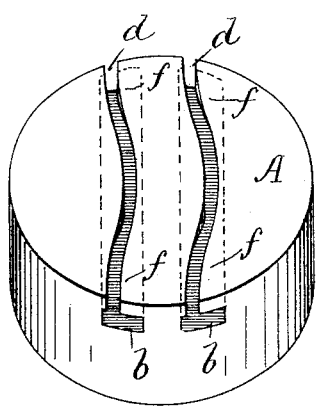
Figure 2:
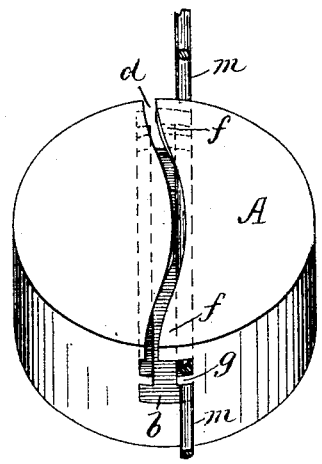

In said drawings, Figure 1 is a perspective view of an insulating-block embodying my invention. Figs. 2 and 3 are similar views showing modifications.

My device is simple and will be readily understood from the following description.

A represents the insulator, which may be of any desirable shape and of any well-known insulating material.

*b* is a recess or passage, which is formed in the insulator and which is large enough to receive the wire, this recess or passage extending straight through the insulator, as shown.

*d* is a slot or opening leading from the recess *b* to the face or outside of the insulator. The slot *d* is large enough to allow the wire *m* to be passed into the recess *b*, and is curved as shown, so as to form at least two overhanging lips or flanges *f f* on one side of the slot and one on the other, each of these lips or flanges extending to and it may be beyond the median-line of the slot.

To secure the wire, it is bent into the curved shape of the slot *d* and pressed inwardly through the slot in the recess *b*. The walls of the recess *b* being straight or not coincident with the slot *d*, the wire is allowed to straighten in the recess and cannot be withdrawn without again bending it into the curved form of the slot *d*. The wire is in this way prevented from being accidentally dislodged or thrown out of contact with the insulator. In other words, the recess *b* for the wire is so closed in front as to prevent the dislodgment of the wire without bending it in a peculiar manner. Insulators of this class are intended more particularly for guide-insulators.

When it is desired to provide for two wires, the insulator may be constructed as shown in Figs. 2 and 3. In Fig. 2 the recess *b* is deepened, a rib or projection $g$ being formed therein to separate it lengthwise into two portions, in each of which a wire may be placed. In Fig. 3 the recess $b$ and slot $d$ are duplicated and arranged side by side on the insulator, thus providing for the reception of two wires.

What I claim is—

An insulator for electric wires, having a straight recess or passage $b$ through the same to receive the wire and permit the latter to move endwise with freedom and having a curved slot leading into the said recess or passage for the introduction of the wire, two overhanging lips or flanges being formed on one side of the slot and one on the other, substantially as described.

In testimony whereof I affix my signature in presence of two witnesses.

CHARLES N. HAMMOND.

Witnesses:
WM. A. MACLEOD,
A. H. MORRISON.